United States Patent [19]
> Miyake et al.

[11] Patent Number: 4,683,253

[45] Date of Patent: Jul. 28, 1987

[54] RESIN MOLDING COMPOUND FOR SEALING ELECTRONIC PARTS

[75] Inventors: Yoshifumi Miyake; Sumio Sakka, both of Hirakata, Japan

[73] Assignee: Risho Kogyo Co., Ltd., Osaka, Japan

[21] Appl. No.: 829,095

[22] Filed: Feb. 12, 1986

[30] Foreign Application Priority Data

Feb. 12, 1985 [JP] Japan ................................. 60-25921

[51] Int. Cl.$^4$ ............................................. C08K 3/22
[52] U.S. Cl. ................................... 523/442; 523/443; 524/413; 524/430; 524/493; 524/497; 106/288 B
[58] Field of Search ............... 523/442, 443, 515, 516, 523/521; 524/413, 430, 493, 497; 106/288 B, 300

[56] References Cited

U.S. PATENT DOCUMENTS 2,941,895 6/1960 Haslam .................................. 106/300
3,071,482 1/1963 Miller ................................... 106/300
4,068,024 1/1978 Laufer .............................. 106/288 B

*Primary Examiner*—Lewis T. Jacobs
*Attorney, Agent, or Firm*—Wenderoth, Lind & Ponack

[57] ABSTRACT

The present invention relates to a resin molding compound for sealing electronic parts.

In general, electronic parts are sealed in ceramic packages or synthetic resin molding compounds in order to protect them from an external circumstance in the use thereof.

In many cases, materials consisting of synthetic resins and inorganic fillers mainly comprising silicon oxide have been used as sealing materials for synthetic resin molding compounds.

However, a defect has occurred in that since an infinitesimal quantity of radioactive elements such as uranium and thorium is contained in inorganic fillers, a memory element in electronic parts produces misactions by alpha-rays radiated from radioactive elements according to circumstances and thereby the fidelity of electronic parts is greatly influenced.

The present invention was achieved in order to eliminate this defect and it is an object of the present invention to provide resin molding compounds for sealing electronic parts consisting of synthetic inorganic metal oxides, which are obtained by hydrolyzing, drying, pulverizing and thermally oxidizing purified metal alkoxides having hydrolyzable groups, and synthetic resins.

3 Claims, No Drawings

RESIN MOLDING COMPOUND FOR SEALING ELECTRONIC PARTS

The present invention relates to high purity and low alpha-ray resin molding compounds for sealing electronic parts consisting of synthetic resins and a single or a plurality of synthetic inorganic metal oxides which are obtained by hydrolyzing metal alkoxides.

Usually, electronic parts have been sealed in ceramic packages or synthetic resins or the like in order to protect them from an external circumstance. And, it is the present state that synthetic resin molding compounds are used for this sealing material in respect of price and production.

Although these existing synthetic resin molding compounds consist of synthetic resins and inorganic fillers mainly comprising silicon oxide (silica), it is desired that these compositions have low expansion property, high heat conductance, low hygroscopic property, low stress-low strain property and superior mechanical characteristics to an extent as far as possible and in addition, it is advantageous that these inorganic fillers are used at a large ratio as far as the moldability thereof permits in order to reduce the price of synthetic resin molding compounds. It is said that silicon oxide type fillers are most preferable for this end, so that they have been used for almost all sealing resin materials.

These silicon oxide type fillers include two types—crystal type and amorphous type but every one of them has advantages and disadvantages, so that it is the existing state that they are used properly according to the uses thereof.

Also, since these silicon oxide type fillers must be used at a large ratio as described above, silicon oxide powders having a comparatively large average particle size such as 1 to 120 $\mu$m are preferably used, so that silica brick powders, which are obtained by melting and sintering at 1,800° to 2,300° C., pulverizing, treating with acids, washing with water and drying natural ores, and the like have been used.

On the other hand, the high integralization is making progress at a high tempo in memory elements sealed with synthetic resin molding compounds of such type with the technical innovation. A stage of LSI and VLSI has reached and it is the existing state that this memory element produces misactions, in short soft errors, by alpha-rays radiated from an infinitesimal amount of radioactive elements, such as uranium and thorium, contained in the inorganic fillers constructing the resin molding compounds for sealing such highly integrated circuits, thereby having a great influence upon the fidelity of 256 Kbit dynamic RAM (random access memory), 1 Megabit dynamic RAM and the like, so that a measure for solving the above described defect is desired.

The following measures are considered:

(1) The surface of a memory element is previously coated with polyimide resins, silicon resins and the like to protect this element from the effect of alpha-rays (chip-coating method).

(2) A great reserve is given to a memory capacity and a circuit in designing.

(3) The surface of particles of the fillers is previously coated with resins to protect from the effect of alpha-rays (particle surface-precoating method).

(4) High-purity or low alpha-ray fillers and additives obtained by the purification are used (sealing agent-refining method), and the like. However, the method (1) is difficult to accurately coat the appointed area of the resin at the appointed film thickness, thereby being incapable of saying that it is advantageous in respect of every one of yield, productivity and economy.

Also, the method (2) makes a lot of fruitless design, and the method (3) reduces the heat conductance (heat-radiating property) required for preventing the internal heating accompanied by the high integralization from increasing, thereby leading to a vital defect of the memory element, so that both methods (2) and (3) are not preferable.

Accordingly, it can be thought that the method (4) is most effective and rational.

The present invention can provide a resin molding compound for sealing electronic parts comprising high purity and low alpha-ray synthetic inorganic metal oxides by overcoming the above described various disadvantageous conditions.

That is to say, the present invention provides a resin molding compound for sealing electronic parts consisting of 100 parts by weight of synthetic resins and 50 to 800 parts by weight of synthetic inorganic metal oxides and is characterized by the fact that the synthetic inorganic metal oxides are obtained by hydrolyzing, drying, pulverizing and thermally oxidizing purified metal alkoxides having hydrolyzable groups.

The present invention will be described below in detail. It was found from the present inventors' various kinds of investigation on a measure for preventing misactions of a memory element by the radiation of alpha-rays from producing that high purity and low alpha-ray scaling resin molding compounds hardly containing radioactive elements such as uranium and thorium can be obtained by using synthetic inorganic metal oxides of single structure or multistructure, which are obtained by hydrolyzing metal alkoxides, in place of conventional natural silica brick as the main constitutional ingredient of resin molding compounds for sealing electronic parts.

Also, it has been determined that the following superior characteristics can be achieved in addition to high-purity and low alpha-ray property by using the above described synthetic inorganic metal oxides:

(A) The resin molding compound is superior in workability due to superior molding fluidity after formed in a sealing resin molding compound, a small amount of burr when removed from a molding die, and superior releasing property.

(B) A uniform compound can be obtained because the synthesis is carried out in the solution.

The synthetic inorganic metal oxides used in the present invention and the starting raw materials for synthesizing them include the following substances:

| Starting raw materials | Synthetic inorganic metal oxides |
| --- | --- |
| $Si(OR)_4$ | $SiO_2$ |
| $Al(OR)_3 \cdot Si(OR)_4$ | $Al_2O_3\ SiO_2$ |
| $Ti(OR)_4\ Si(OR)_4$ | $TiO_2\ SiO_2$ |
| $Zr(OR)_4\ Si(OR)_4$ | $ZrO_2\ SiO_2$ |
| (wherein R: alkyl group). | |

The synthetic inorganic metal oxides are obtained by hydrolyzing alkoxide groups in the presence of catalysts such as acids to increase the polymerization degree and as a result, turn into a gel-like substance, and subsequently heating to dry, pulverizing, and burning.

Thus obtained synthetic inorganic metal oxides contain radioactive elements, such as uranium and thorium, at a ratio of 1 ppb or less and also sodium and potassium, which seem to be a cause of the corrosion of an electronic circuit after the electronic parts was sealed, at a remarkably small ratio such as 1 ppm or less. Accordingly, these synthetic inorganic metal oxides are especially useful for materials of resin molding compounds for sealing electronic parts.

The incorporation of the synthetic inorganic metal oxides into synthetic resins may be carried out by the conventional hot roll kneader, screw type continuous blender and the like.

The synthetic inorganic metal oxides are used a ratio of 50 to 800 parts by weight, preferably 100 to 600 parts by weight, based on 100 parts of synthetic resins.

Suitable heat setting or thermosetting resins include epoxy resins, silicone resins, epoxy-silicone denatured resins, and polyimide resins. Additionally, suitable synthetic thermoplastic resins include polyphenylene sulfide resins, polyphenylene oxide resins, and polyethylene terephthalate resins.

The reason why the synthetic inorganic metal oxides are used at a ratio of 50 to 800 parts by weight based on 100 parts of synthetic resin is that the effect of using them can not be brought into play at a ratio of 50 parts by weight or less and the resin molding compounds for sealing electronic parts are deteriorated in not only moldability but also mechanical characteristic at a ratio of 800 parts by weight or more.

Also, there will be no harm in adding various kinds of additive, for example coloring agents and internal releasing agents, to the resin molding compound according to the present invention in the same manner as that in the conventional resin molding compounds for sealing electronic parts.

The resin molding compound according to the present invention is used for sealing electronic parts and the electronic parts can be sealed by every one of the injection molding method, the compression molding method and the transfer molding method. In addition, electronic parts sealed with resins and without producing soft errors due to alpha-rays and containing corrosive elements such as sodium and potassium can be easily and efficiently produced by using this compound, so that the high quality and the economical effect can be simultaneously brought into play.

The present invention is below described in detail with reference to the preferred embodiments.

EXAMPLE 1

1-(1) Preparation of silicon oxide powders 450 ml of ethyl alcohol was added to 800 ml of tetraethyl silicate oligomer (tetraethyl silicate 40 manufactured by Colcoat Co., Ltd.) and the mixture was uniformly dissolved. The resulting solution was flown down through a column filled with cation exchange resin (Duolite C-20 manufactured by Sumitomo Chemical Industry Co., Ltd.) and a column filled with anion exchange resin (Duolite A-1010 manufactured by Sumitomo Chemical Industry Co., Ltd.) at a flow rate of 1 l/hour to remove an infinitesimal quantity of uranium and alkaline metal ions such as sodium and potassium contained in the solution.

120 ml of water purified by the ion exchange was added to the above described oligomer solution purified by the above described purifying process and then 12 ml of 1 N-HCl was gradually added drop by drop with stirring by means of a Teflon stirring blade at room temperature. After 10 to 12 minutes from the completion of the addition of 1 N-HCl, the temperature of the solution rises up to 65° to 68° C. owing to its internal exothermic effect. Subsequently, the hydrolysis was carried out for 4 hours with maintaining a temperature of a water bath at 65° to 70° C. Thus, a white cloudy solution mixture was turned into a transparent viscous solution.

Then, the above described transparent viscous solution was transferred in a wide-mouth vessel and left for 16 hours to 30° C. to turn into a substance which gelled.

Subsequently, the resulting transparent substance, which gelled, is roughly ground, heated for 12 hours at 80° to 100° C. to dry, heated for 2 hours at 200°, 300°, 400° and 600° C., respectively, and finally heated for 6 hours at 800° C. As a result, 320 g of pure-white silicon oxide powder was obtained. The yield based on tetraethyl silicate oligomer was 40%.

The content of uranium in the obtained synthetic silicon oxide was determined by the fluorescence analysis with the result of 1 ppb or less. In addition, the synthetic silicon oxide was tested on the alpha-ray flux density by means of a gas flow proportional counter (LACS-1000 manufactured by Sumitomo Aluminum Refinery Co., Ltd.) with the result of 0.002 count/$cm^2$·hour or less.

Also, the content of sodium as well as potassium in the synthetic silicon oxide was determined by the atomic absorption analysis with the result of 1 ppm or less.

1-(2) Production of a resin molding compound for sealing electronic parts 688 parts by weight of the synthetic silicon oxide powder obtained in 1-(1), 5.6 parts by weight of antimony trioxide, 3 parts by weight of carbon black, 4.4 parts by weight of wax and 2.5 parts by weight of 2-phenyl-4-methyl-5-hydroxymethyl imidazole as an accelerator were added to a resin molding compound comprising 150 parts by weight of cresol novolac epoxy resin, 45 parts by weight of brominated cresol novolac epoxy resin and 87 parts by weight of phenol novolac resin. The resulting mixture was blended for 6 minutes at 65° to 70° C. by means of a two-roll type hot mill and then pulverized to obtain a resin molding compound 1 for sealing electronic parts.

EXAMPLE 2

2-(1) Preparation of silicic acid-alumina powders 900 ml of tetraethyl silicate [$Si(OC_2H_5)_4$] (Tetraethyl Silicate 28 manufactured by Colcoat Co., Ltd.) and 2,500 ml of aluminum isoprophylate [$Al(OC_3H_7)_3$] were weighed in a three-mouth flask having a capacity of 5 litter and 500 ml of isopropyl alcohol was added in the flask with stirring to uniformly dissolve the content in the flask. Subsequently, 500 ml of liquid ammonia having pH of 9.0 was added drop by drop at a rate of 10 ml/min. After the completion of the addition of liquid ammonia the mixture was hydrolyzed for 4 hours under the reflux at 50° C.

The resulting white sediment was separated by a centrifugal separator, dried for 24 hours at 80° C., and finally heated to the maximum of 1,200° C. at a rate of 200° C./hour with heating for 12 hours at 1,200° C.

As a result, 570 g of pure-white aluminum silicate powder was obtained. These powders had an average particle size of 0.08 to 0.1 μm and were spherical. The content of uranium in the resulting aluminum silicate powder was determined by the same measuring method as in Example 1 with the result of 1 ppb or less. Also, the alpha-ray flux density was 0.002 count/cm² hour or less.

2-(2) Production of a resin molding compound for sealing electronic parts

The process was carried out in the same manner as in Example 1-(2) excepting that 138 parts by weight of aluminum silicate powder obtained in 2-(1) and 550 parts by weight of synthetic silicon oxide powder obtained in 1-(1) were added to a resin molding compound having the same composition as in Example 1-(2). Thus, a resin molding compound 2 for sealing electronic parts was obtained.

EXAMPLE 3 3-(1) Preparation of silicic acid zirconia powders

A mixture of 4,200 ml of tetraethyl silicate, 810 ml of tetra-n-propoxy zirconium [$Zr(OC_3H_7)_4$] and 500 ml of anhydrous ethanol was subjected to the reflux for 3 hous at 80° C. in a four-mouth flask and then cooled to room temperature.

Subsequently, 650 ml of pure water and 6 ml of 1 N-HCl were added to 500 ml of ethanol and then the resulting mixture was added drop by drop to the above described mixture. After the completion of the addition the mixture was hydrolyzed for 2 hours at 50° C. with stirring. Then, the reaction mixture was transferred to a wide-mouth vessel and left for 24 hours at room temperature to turn into a substance which gelled.

The substance, which gelled, was pulverized and then heated to the maximum of 800° C. at a rate of 100° C./hour with heating for 24 hours at 800° C. As a result, 1,300 g of white silicic acid zirconia powder was obtained. The uranium content of the resulting silicic acid zirconia was 1 ppb or less and the alpha-ray flux density 0.002 count/cm² hour.

3-(2) Production of a resin molding compound for sealing electronic parts

The process was carried out in the same manner as in Example 1-(1) excepting that 688 parts by weight of synthetic silicon oxide powder in Example 1-(1) was replaced with silicic acid zirconia powders obtained in the above 3-(1). Thus, a resin molding compound 3 for sealing electronic parts was obtained.

COMPARATIVE EXAMPLE

The process was carried out in the same manner as in Example 1-(2) except that synthetic silicon oxide in the above Example 1-(2) was replaced with silica RD-8 (manufactured by Tatsumori Co., Ltd.) which was obtained by fusing natural silica brick on the market for the same use. As a result, a resin molding compound 4 having the same composition as in Example 1-(2) was produced.

Resin molding compounds 1 to 4, which were obtained in the above Examples 1 to 3 and Comparative Example, were tested on the uranium content, alpha-ray content, molding fluidity, flexural strength, linear expansion coefficient and the like. The results are shown in the following Table 1.

TABLE 1

| Item | Resin Molding Compound | | | |
| --- | --- | --- | --- | --- |
| | Example 1-1 | Example 2-2 | Example 3-3 | Comparative Example 4 |
| Uranium content (ppb) | 1 or less | 1 or less | 1 or less | 160 |
| Alpha-ray content (count/cm².hour) | 0.002 or less | 0.002 or less | 0.002 or less | 0.063 |
| Spiral flow (inch) | 32.1 | 25.0 | 35.0 | 27.3 |
| Linear expansion coefficient (1/°C.) | $1.88 \times 10^{-5}$ | $1.80 \times 10^{-5}$ | $1.86 \times 10^{-5}$ | $2.05 \times 10^{-5}$ |
| Flexural strength (kg/mm²) | 16.4 | 11.0 | 12.3 | 12.9 |
| Volume resistance coefficient (Ω·cm) | | | | |
| in an air of 150°C. | $7.4 \times 10^{13}$ | $8.8 \times 10^{13}$ | $6.1 \times 10^{13}$ | $1.7 \times 10^{13}$ |
| after boiling at 200°C. | $1.2 \times 10^{15}$ | $2.2 \times 10^{15}$ | $8.5 \times 10^{15}$ | $3.3 \times 10^{14}$ |

It is found from Table 1 that the resin molding compound for sealing electronic parts according to the present invention shows not only the alpha-ray content due to uranium and thorium remarkably smaller in comparison with a resin molding compound containing silica, which was obtained by fusing natural silica brick, produced in Comparative Example but also superior electric characteristics, boiling resistance and mechanical characteristics.

In particular, a resin molding compound produced in Example 2-(2), in which silicic acid-alumina powders (Example 2-(2)) were used as fillers together with silicon oxide powders (Example 1-(1)), showed the mechanical strength improved by even 20%. Also, it was found that the use of silicic acid-zirconia powders (Example 3-(2)) led to an improvement of a resin composite (Example 3-(3)) in boiling resistance.

In addition, it was found that a resin molding compound for sealing electronic parts according to the present invention showed the small linear expansion coefficient, superior fluidity in the molding process, a small amount of burr and superior releasing effect from a molding die.

We claim:
1. A resin molding compound for sealing electronic parts which comprises
   (1) a synthetic resin, and
   (2) from 100 to 600 parts per 100 parts of synthetic resin of at least one synthetic inorganic metal oxide produced by hydrolyzing a purified metal alkoxide having hydrolyzable groups, drying the resultant product, pulverizing the dried product and thermally oxidizing the pulverized product, the synthetic inorganic metal oxide having an average particle size of 0.5 to 120 μm and said inorganic metal oxide containing radioactive elements in an amount of 1 part per billion or less and containing sodium and potassium in an amount of 1 part per million or less.
2. A resin molding compound according to claim 1 wherein the synthetic resin is at least one heat setting resin selected from the group consisting of an epoxy resin, a silicon resin, an epoxy-silicon denatured resin and a polyimide resin.
3. A resin molding compound according to claim 1 wherein the synthetic resin is at least one thermoplastic resin selected from the group of a polyphenylene sulfide resin, a polyphenylene oxide resin and a polyethylene terephthalate resin.

* * * * *